United States Patent [19]

Shibayama

[11] Patent Number: 5,035,159
[45] Date of Patent: Jul. 30, 1991

[54] SHIFT CONTROL SYSTEM FOR AUTOMATIC TRANSMISSION

[75] Inventor: Takashi Shibayama, Isehara, Japan

[73] Assignee: Nissan Motor Co., Ltd., Yokohama, Japan

[21] Appl. No.: 373,871

[22] Filed: Jun. 30, 1989

[30] Foreign Application Priority Data

Jul. 1, 1988 [JP] Japan .................. 63-162710

[51] Int. Cl.⁵ .............................................. B60K 41/18
[52] U.S. Cl. .............................................. 74/866
[58] Field of Search ................. 74/844, 861, 866, 851, 74/854, 855

[56] References Cited

U.S. PATENT DOCUMENTS

| | | | |
|---|---|---|---|
| 3,693,479 | 9/1972 | Toyoda et al. | 74/866 |
| 4,215,596 | 8/1980 | Long | 74/851 |
| 4,271,728 | 6/1981 | Wakamatsu | 74/866 |
| 4,523,281 | 6/1985 | Noda et al. | 74/866 |
| 4,569,255 | 2/1986 | Holmes | 74/866 |
| 4,669,335 | 6/1987 | Matsuoka et al. | 74/866 |
| 4,680,992 | 7/1987 | Hayasaki et al. | 74/869 |
| 4,693,225 | 9/1987 | Abe et al. | 74/866 |
| 4,790,215 | 12/1988 | Hamano | 74/866 |
| 4,807,497 | 2/1989 | Yasue et al. | 74/866 |

OTHER PUBLICATIONS

"Maintenance Manual for RE4R01A Type Automatic Transmission", (A261C07), Published by Nissan Motor Company, Mar. 1987.

Primary Examiner—Dirk Wright
Attorney, Agent, or Firm—Foley & Lardner

[57] ABSTRACT

A shift control system for an automatic transmission is disclosed, in which the servo activating pressure modulating means, modulating the servo activating pressure during a period of shifting in response to signal from the signal generating means, sets the shift feel in accordance with a command to the shift feel modulating means manually made by a driver. Further, the shift feel can also be set in accordance with the driver's command by modulating output torque of the engine during a period of shifting in response to the signal. Furthermore, upon modulating the shift feel, more remarkable modulation thereof is obtained by also modulating a shift point of the automatic transmission by the shift point modulating means.

4 Claims, 9 Drawing Sheets

SHIFT CONTROL SYSTEM FOR AUTOMATIC TRANSMISSION

BACKGROUND OF THE INVENTION

1. Field of the Invention

The present invention relates to a shift control system for an automatic transmission and, more particularly, to a technique of manual selection of a demand for a shift feel.

2. Description of the Prior Art

An automatic transmission has as its function to select a shifting stage by selectively hydraulically operating a plurality of friction elements such as a clutch and a brake, and to change the selected shifting stage to the other by shifting a friction element to be operated (A working hydraulic pressure on the friction element operated then is referred to in particular as to a servo activating pressure).

In regard to a shift feel upon shifting operation, i.e., quickness and softness of shifting, the servo activating pressure has been determined in a manufacturing stage of vehicles as seen in the automatic transmission described in "MAINTENANCE MANUAL FOR RE4R01A TYPE AUTOMATIC TRANSMISSION" (A261C07) published by NISSAN MOTOR CO., LTD. in March 1987, causing an impossibility of changing the pressure in accordance with an individual taste and/or sensibility of a driver after vehicle manufacturing.

Thus, some drivers felt a great shifting shock because of too quick shifting, others an insufficiency of quickness because of too slow shifting, being obliged to ride in their vehicle without satisfaction. Additionally, in the event that the initial shift feeling was varied by reason of aged deterioration of the automatic transmission, the driver could not change it by himself so that it needed a complicated adjustment of the automatic transmission in a repair shop.

Therefore, an object of the present invention is to provide a shift control system for an automatic transmission in which the shift feel can be manually changed.

A specific object of the present invention is to provide a shift control system for an automatic transmission which induces more remarkable change of the shift feel by also changing a shift point of the automatic transmission.

SUMMARY OF THE INVENTION

Generally, according to the present invention, there is provided a shift control system for an automatic transmission for a vehicle including an engine, the automatic transmission selecting a shifting stage by selectively hydraulically operating a plurality of friction elements by a servo activating pressure, the shift control system comprising:

manually operable means for modulating a demand for a shift feel and generating a signal indicative of said demand modulated; and means for modulating a predetermined variable which affects a quality of shifting operation in response to said signal.

According to one aspect of the present invention, there is provided a shift control system for an automatic transmission which selects a shifting stage by selectively hydraulically operating a plurality of friction elements by a servo activating pressure, comprising:

manually operable means for modulating a demand for a shift feel and generating a signal; and means for modulating the servo activating pressure during a period of shifting in response to said signal.

According to another aspect of the present invention, there is provided a shift control system for an automatic transmission for a vehicle having an engine, the automatic transmission selecting a shifting stage by selectively hydraulically operating a plurality of friction elements by a servo activating pressure, comprising:

manually operable means for modulating a demand for a shift feel and generating a signal; and means for modulating output torque of the engine during a period of shifting in response to said signal.

According to a further aspect of the present invention, there is provided a shift control system for an automatic transmission for a vehicle having an for engine and changing vehicle speed by selectively hydraulically operating a plurality of friction elements by a servo activating pressure, comprising:

manually operable means for modulating a demand for a shift feel and generating a signal;

means for modulating the servo activating pressure during a period of shifting in response to said signal;

means for modulating output torque of the engine during a period of shifting in response to said signal; and means for modulating a shift point in response to said signal.

DETAILED DESCRIPTION OF THE INVENTION

Figure 1:
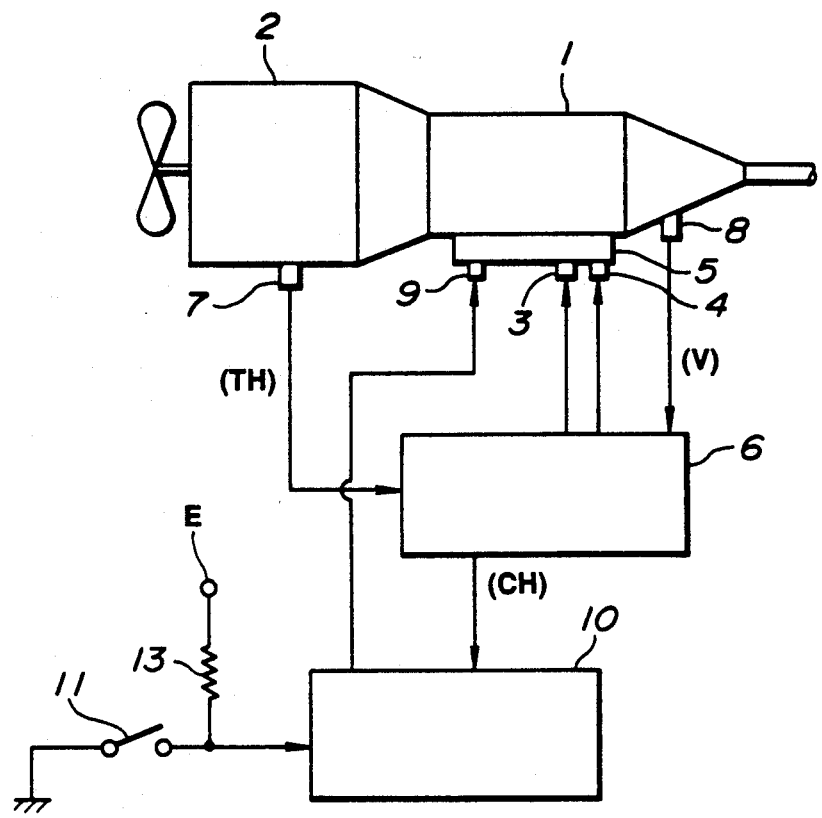
FIG. 1 is a diagrammatic view illustrating a first embodiment of a shift control system according to the present invention.

Referring first to FIG. 1, there is shown a first embodiment of a shift control system for an automatic transmission according to the present invention. In FIG. 1, a reference numeral 1 denotes an automatic transmission and a numeral 2 denotes an engine disposed upstream thereof. In the embodiment, the automatic transmission 1 is of the RE4R01A type described in the before mentioned MAINTENANCE MANUAL FOR RE4R01A TYPE AUTOMATIC TRANSMIS- SION (A261C07) published by NISSAN MOTOR CO., LTD. in March 1987. The automatic transmission 1 of the above mentioned type is also disclosed in the U.S. Pat. No. 4,680,992 (Hayasaki et al.) which is hereby incorporated in its entirety by reference.

The automatic transmission 1 is provided with a valve body 5 which incorporates various control valves including a first shift solenoid 3 and a second shift solenoid 4, and a hydraulic circuit. In the combination of ON and OFF of the first and second shift solenoids 3 and 4 shown in TABLE 1, shifting stages are obtained by selectively hydraulically operating a plurality of friction elements (not shown) in the automatic transmission 1.

TABLE 1

| SHIFTING STAGES | SHIFT VALVES | |
| --- | --- | --- |
|  | 1st SOL 3 | 2nd SOL 4 |
| 1st SPEED | ON | ON |
| 2nd SPEED | OFF | ON |
| 3rd SPEED | OFF | OFF |
| 4th SPEED | ON | OFF |

Figure 2:
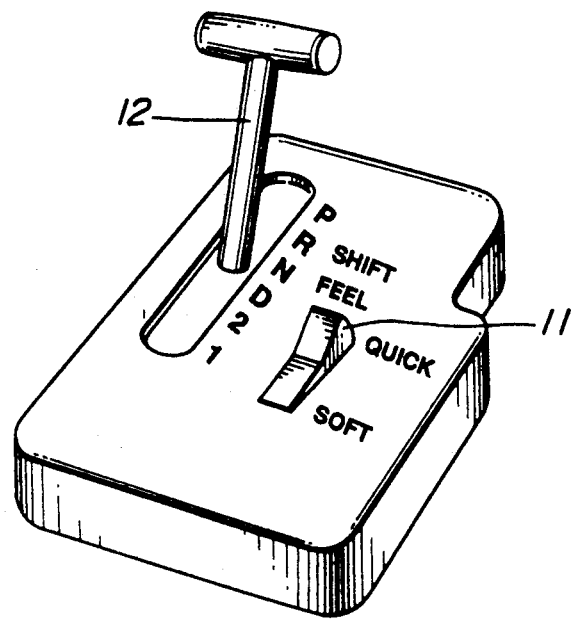
FIG. 2 is a perspective view illustrating a shift feel switch used in the first embodiment.
Figure 3:
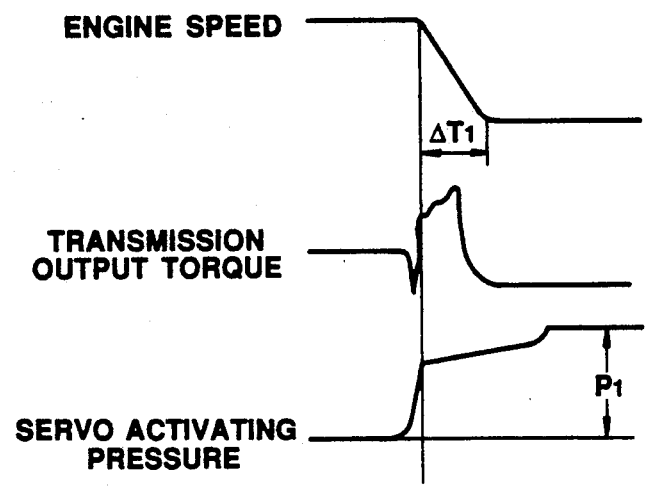
FIGS. 3 and 4 are time charts of the first embodiment, respectively.
Figure 4:
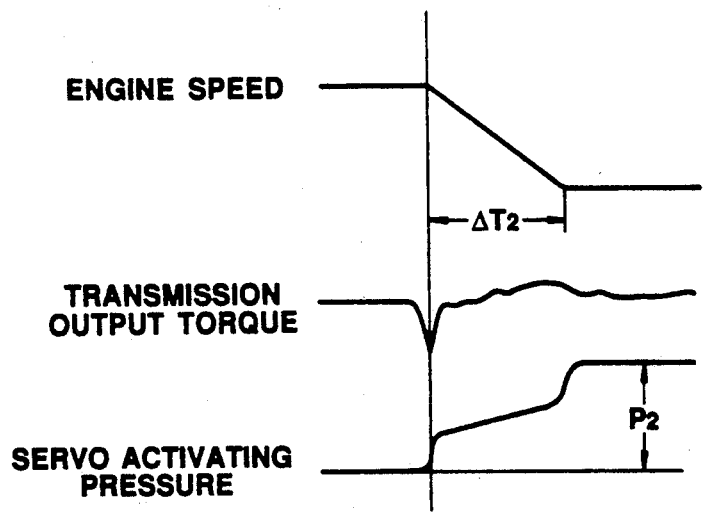

Thus, power of the engine 2 is changed by the automatic transmission 1 at a gear ratio corresponding to a shifting stage selected, which is outputted to wheels to run a vehicle. An electronic shift control circuit 6 is provided to control selection of a predetermined shifting stage and change of the shifting stage, to which signals from a throttle sensor 7 for sensing a throttle opening degree TH and a vehicle speed sensor a 8 for sensing vehicle speed V are inputted, respectively. On the basis of signals from the sensors 7 and 8, the shift control circuit 6 calculates a shifting stage from a shift pattern shown by fully drawn line in FIG. 8 it is to be noted that upshift lines are drawn on corresponding downshift lines for convenience's sake) and performs on-off control of the shift solenoids 3 and 4 (refer to TABLE 1) to correspond to the calculated shifting stage, thereby to urge the automatic transmission 1 into selecting a predetermined shifting stage. When a service condition changes in a manner to cross one of the shift lines shown by fully drawn line in FIG. 8, the shift control circuit 6 shifts the combination of ON and OFF of the shift solenoids 3 and 4. As a result, the valve body 5 changes a friction element to be operated and works one which is not operated then by the servo activating pressure, allowing change of a shifting stage to the other. According to the present invention, the servo activating pressure is changed during a period of shifting by a driver, thereby to change a shift feel. Consequently, in the embodiment, there are provided means for changing or modulating the servo activating pressure including a pressure control valve 9 for controlling the servo activating pressure on the valve body 5 and a servo activating pressure control circuit 10. Output of the circuit 10 is provided to the pressure control valve 9. Shift signal CH is indicative of "during a period of shifting" from the shift control circuit 6 is provided to one input of the circuit 10, while a signal from a shift feel switch 11 is provided to the other input of the circuit 10. The shift feel switch 11 is comprised of means for modulating a demand for a shift feel in the present invention, which is disposed in parallel with a select lever 12 of the automatic transmission 1 as shown in FIG. 2 and is manually turned on or off by a driver. Additionally, the switch 11, which has a QUICK position to command a quick shift feel and a SOFT position to command a soft shift feel, opens in the QUICK position and closes in the SOFT position. As shown in FIG. 1, one end of the switch 11 is grounded, while the other end is connected to a power supply E through a resistance 13 as to an well as input of the servo activating pressure control circuit 10. Thus, the switch 11 provides a low level signal to the circuit 10 when closing in the QUICK position, and a high level signal to the circuit 10 when opening in the SOFT position, respectively. The servo activating pressure control circuit 10 increases during a period of shifting the servo activating pressure as indicated by $P_1$ in FIG. 3 through the pressure control valve 9, when the signal from the switch 11 is at a low level and when the shift signal CH is inputted from the shift control circuit 6. On the other hand, the circuit 10 decreases during a period of shifting the pressure as indicated by $P_2$ in FIG. 4 through the pressure control valve 9, while signal from the switch 11 is at high level and when the shift signal CH is provided from the shift control circuit 6. In order to increase and decrease the servo activating pressure, a line pressure may be increased and decreased or a working pressure on the friction elements may directly be increased and decreased.

The operation of the embodiment is described below:

A driver puts the shift feel switch 11 in the QUICK position when desiring the quick shift feel. As a result, the switch 11 keeps the signal to the servo activating pressure control circuit 10 at a low level. On this condition, if the shift control circuit 6 provides the shift signal CH to the circuit 10 by operation of the automatic transmission 1, the circuit 10 increases during a period of shifting the servo activating pressure through the pressure control valve 9. This shifting operation is as follows: As to upshift operation shown in FIG. 3, the servo activating pressure $P_1$ is high so that its transient pressure is also high in an ascending process. Thus, as seen from a waveform of output torque of the automatic transmission 1, shifting shock is relatively high. But, it will be seen, from a transition time $\Delta T_1$ of an engine speed, that quick shifting can be carried out in response to a driver's command.

On the other hand, the driver puts the shift feel switch 11 in the SOFT position when desiring the soft shift feel with little shifting shock. As a result, the switch 11 keeps the signal to the servo activating pressure control circuit 10 at a high level. On this condition, if the shift control circuit 6 provides the shift signal CH to the circuit 10 by operation of the automatic transmission 1, the circuit 10 decreases during a period of shifting the servo activating pressure through the pressure control valve 9. This shifting operation is as follows: As to upshift operation shown in FIG. 4, the servo activating pressure $P_2$ is low so that its transient pressure is also low in the ascending process. Thus, as seen from a transition time $\Delta T_2$ of the engine speed, soft shifting can be carried out in response to the driver's command, allowing little shifting shock as seen from the waveform of output torque of the automatic transmission 1.

Figure 5:
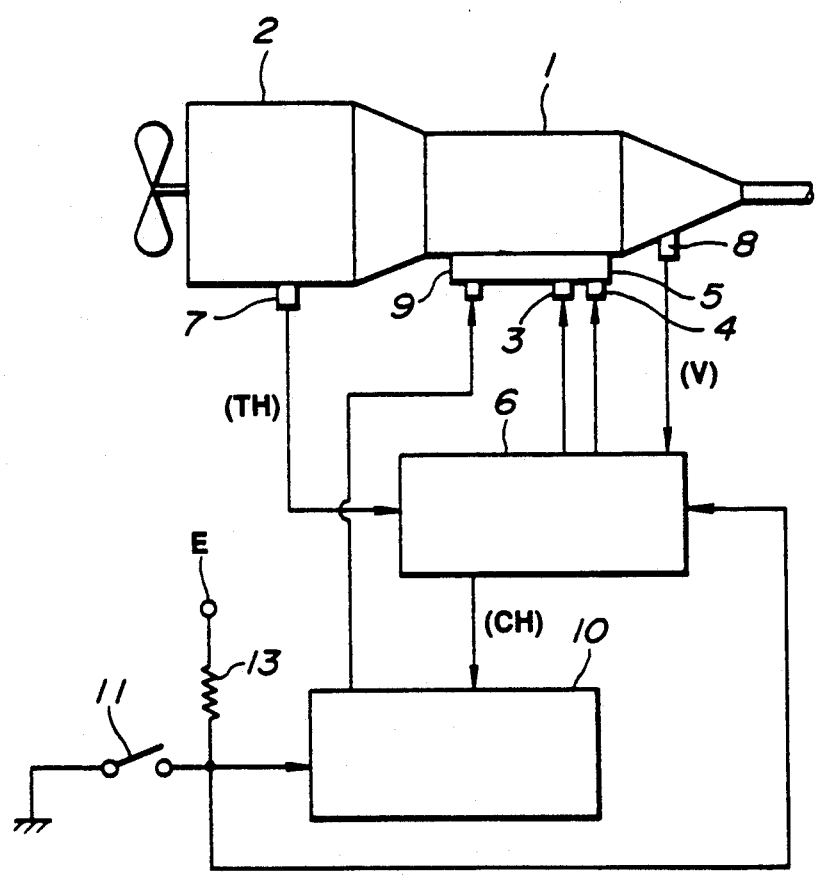
FIG. 5 is a view similar to FIG. 1, illustrating a second embodiment of the present invention.
Figure 6:
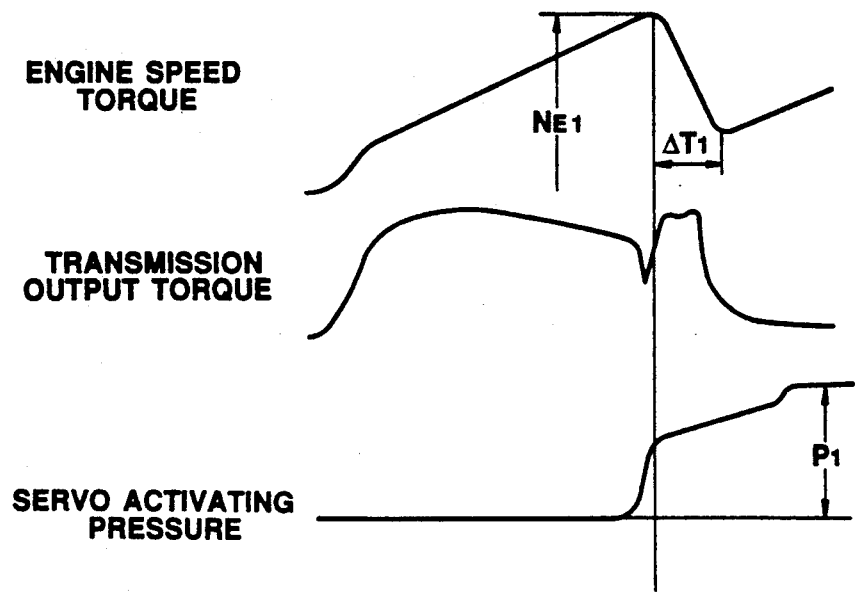
FIGS. 6 and 7 are views similar to FIGS. 3 and 4, illustrated in connection with the second embodiment.
Figure 7:
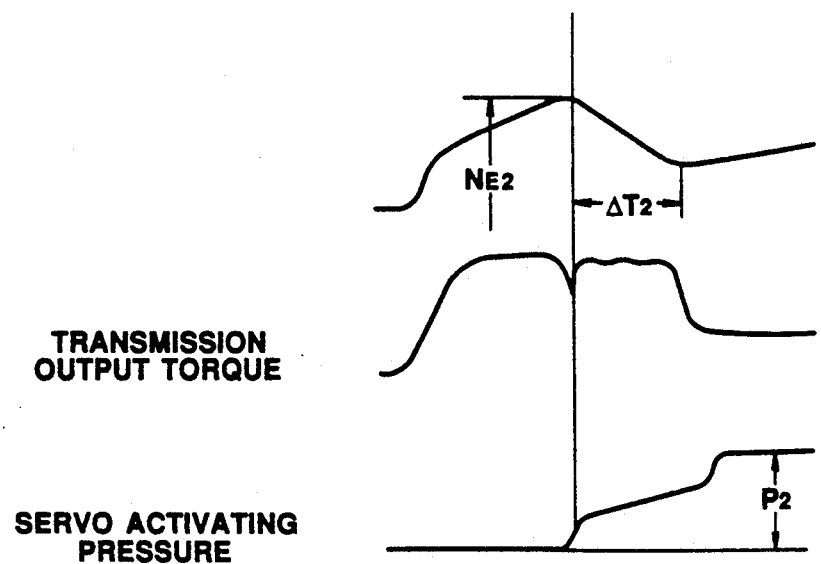

Referring to FIG. 5, there is shown a second embodiment for a shift control system according to the present invention. In the embodiment, the signal from the shift feel switch 11 is also provided to the shift control circuit 6 to change or modulate the shift point. The circuit 6 has as its function to displace the shift lines in the direction of high vehicle speed, or displace the shift lines shown by solid lines to ones shown by dotted lines in FIG. 8, during a period of command of quick shift feel by the switch 11. Change of a shifting stage to the other is performed based on the shift lines shown by dotted lines. As to upshift operation with the shift feel switch 11 put in the QUICK position, the transition time $\Delta T_1$ of the engine speed is reduced due to an increase in the servo activating pressure $P_1$ and shifting is performed at higher engine speed $N_{M1}$ due to displacement of the shifting lines in the direction of high vehicle speed as shown in FIG. 6, allowing the quick and powerful shift feel. On the other hand, as to upshift operation with the shift feel switch 11 put in the SOFT position, the transition time $\Delta T_2$ of the engine speed is augmented due to a decrease in of the servo activating pressure $P_2$ as shown in FIG. 7 and shifting is performed at lower engine speed $N_{E2}$ due to return of the shifting lines to the initial position shown by fully drawn line in FIG. 8, allowing the soft and slow shift feel.

Figure 8:
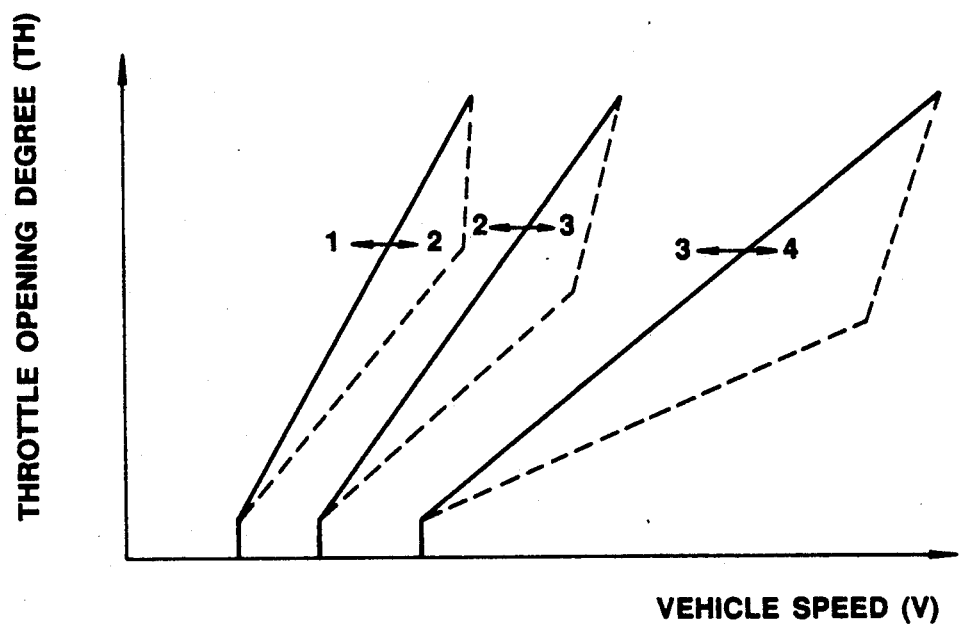
FIG. 8 is a graphical representation illustrating two shift patterns of an automatic transmission.
Figure 9:
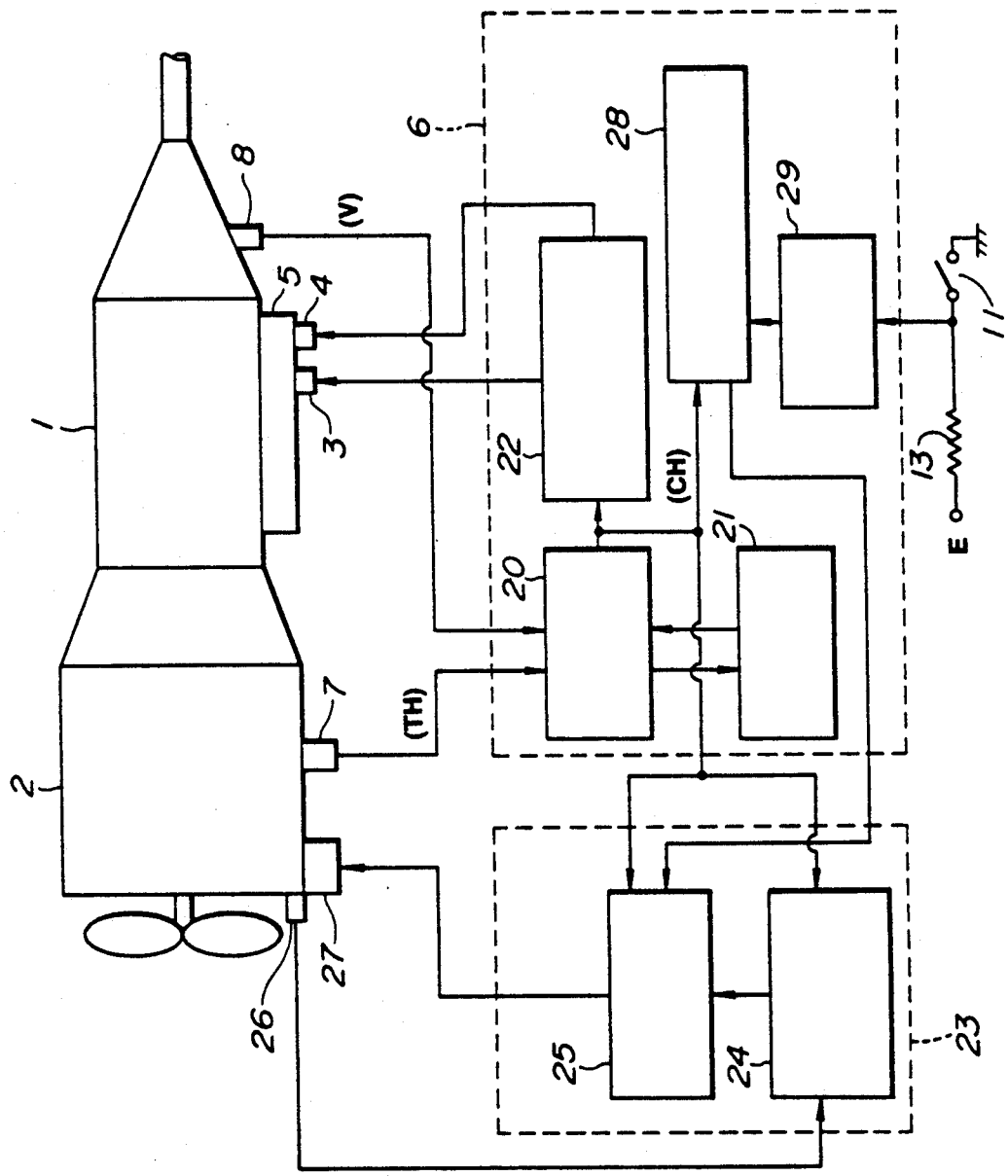
FIG. 9 is a view similar to FIG. 1, illustrating a third embodiment of the present invention.

Referring to FIG. 9, there is shown a third embodiment of a shift control system according to the present invention, in which a demand for the shift feel is modulated by appropriately decreasing the output of the engine 2 by a delay of the ignition timing. The shift control circuit 6 is provided with a shift decision circuit 20 to which signal $\Delta$ from the sensors 7 and 8 are inputted. The shift decision circuit 20 decides a predetermined shifting stage based on the throttle opening degree TH and the vehicle speed V of the shift pattern stored in a shift pattern which is stored in storage circuit 21 and shown by fully drawn line in FIG. 8, and it performs on-off control of the shift solenoids 3 and 4 through a shift valve solenoid drive circuit 22 to obtain the predetermined shift stage. An engine control circuit 23 is provided with a retard timing decision circuit 24 and an ignition timing decision circuit 25, which has as its principal function to perform the ignition by energizing an ignition power transistor 27 at the time suitable to actual service condition based on signal from an engine crank angle sensor 26, thus running the engine 2 efficiently. In the embodiment, there is provided a retard amount decision circuit 28 to which the upshift operation signal CH from the shift decision circuit 20 is inputted. This upshift operation signal CH is also inputted to the cicuits 24 and 25. Output of the circuit 28 is provided to the ignition timing decision circuit 25. Further, the signal from the shift feel switch 11 is inputted to the retard amount decision circuit 28 through an analog-digital (A/D) converter 29. The retard amount decision circuit 28 is comprised means for modulating output torque of the engine in the present invention, which sets the retard amount to zero during the shift feel switch 11 put in the SOFT position thereby to urge the engine control cicuit 23 to perform normal ignition timing control, and commands a predetermined retard amount to the ignition timing decision circuit 25 during the shift feel switch 11 put in the QUICK position and during a period of shifting after receiving the shift signal CH. The circuit 25 has as its function to delay the ignition timing by the predetermined retard amount which is commanded by the circuit 28 and in accordance with a signal from the engine crank angle sensor 26 during a period of shifting after receiving the shift signal CH as retard request signal, thus decreasing engine output.

Figure 10:
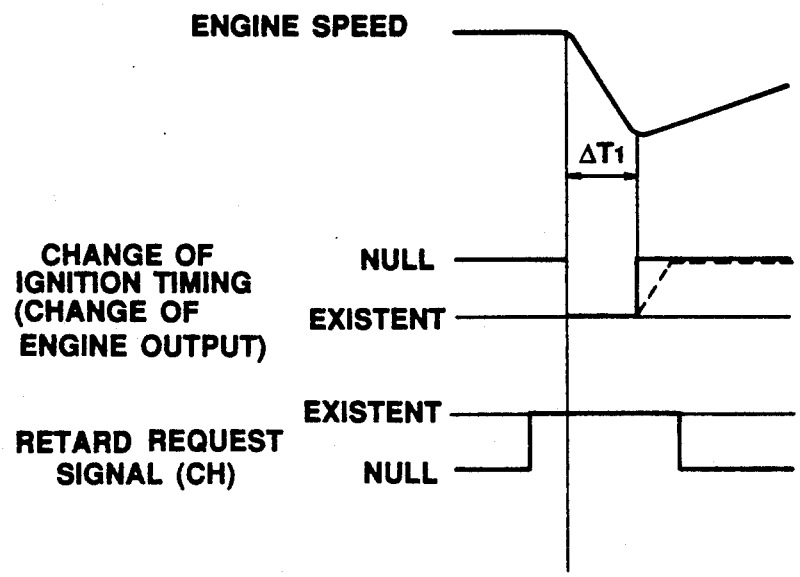
FIGS. 10 and 11 are views similar to FIGS. 3 and 4, illustrated in connection with the third embodiment.
Figure 11:
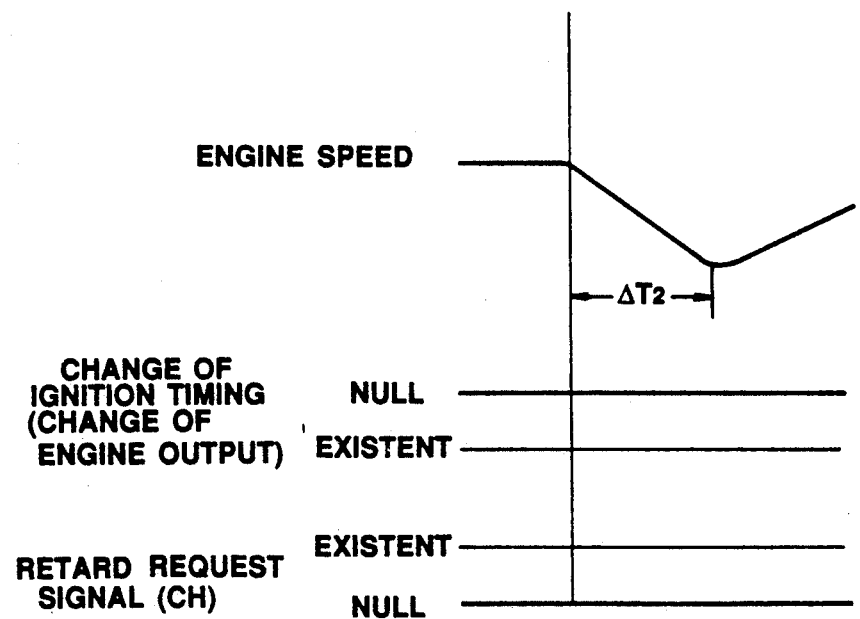

The operation of the embodiment is described below:

When an upshift operation is carried out in the automatic transmission 1 during the shift feel switch 11 put in the QUICK position, the retard amount decision circuit 28 commands a predetermined retard amount to the ignition timing decision circuit 25 based on the signal from the switch 11 and the shift signal CH. Thus, as shown in FIG. 10, the circuit 25 changes or delays the ignition timing during a period of shifting by the predetermined retard amount based on the retard request signal or shift signal CH received, thereby to reduce engine output. As a result, the engine speed is decreased in a short period of time $\Delta T_1$, allowing quick shifting in response to the driver's command. On the other hand, when upshift operation is carried out in the automatic transmission 1 during the shift feel switch 11 put in the SOFT position, the retard request signal does not exist as shown in FIG. 11, consequently, the retard amount decision circuit 28 sets a retard amount to zero so that the ignition timing is not changed and engine output is kept at a normal value. Accordingly, a long period of time $\Delta T_2$ is needed to decrease the engine speed with upshift operation, allowing the soft shift feel in response to the driver's command.

Figure 14:
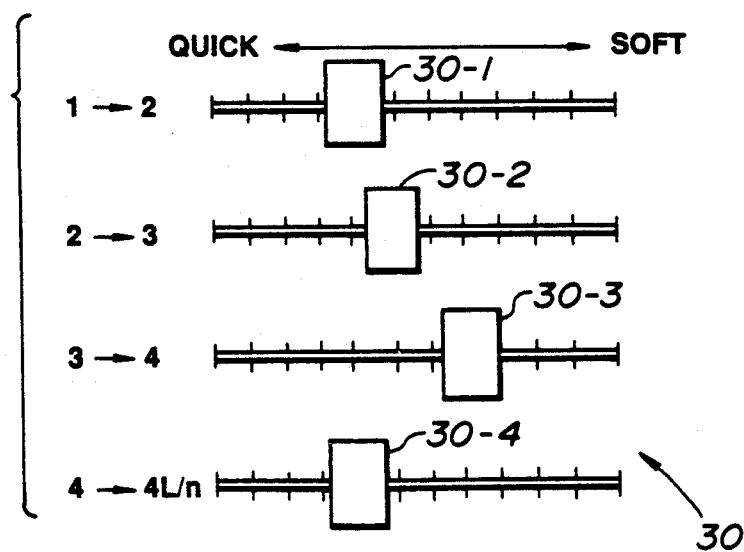
FIG. 14 is a schematic plan view illustrating another example of the shift feel adjuster.
Figure 12:
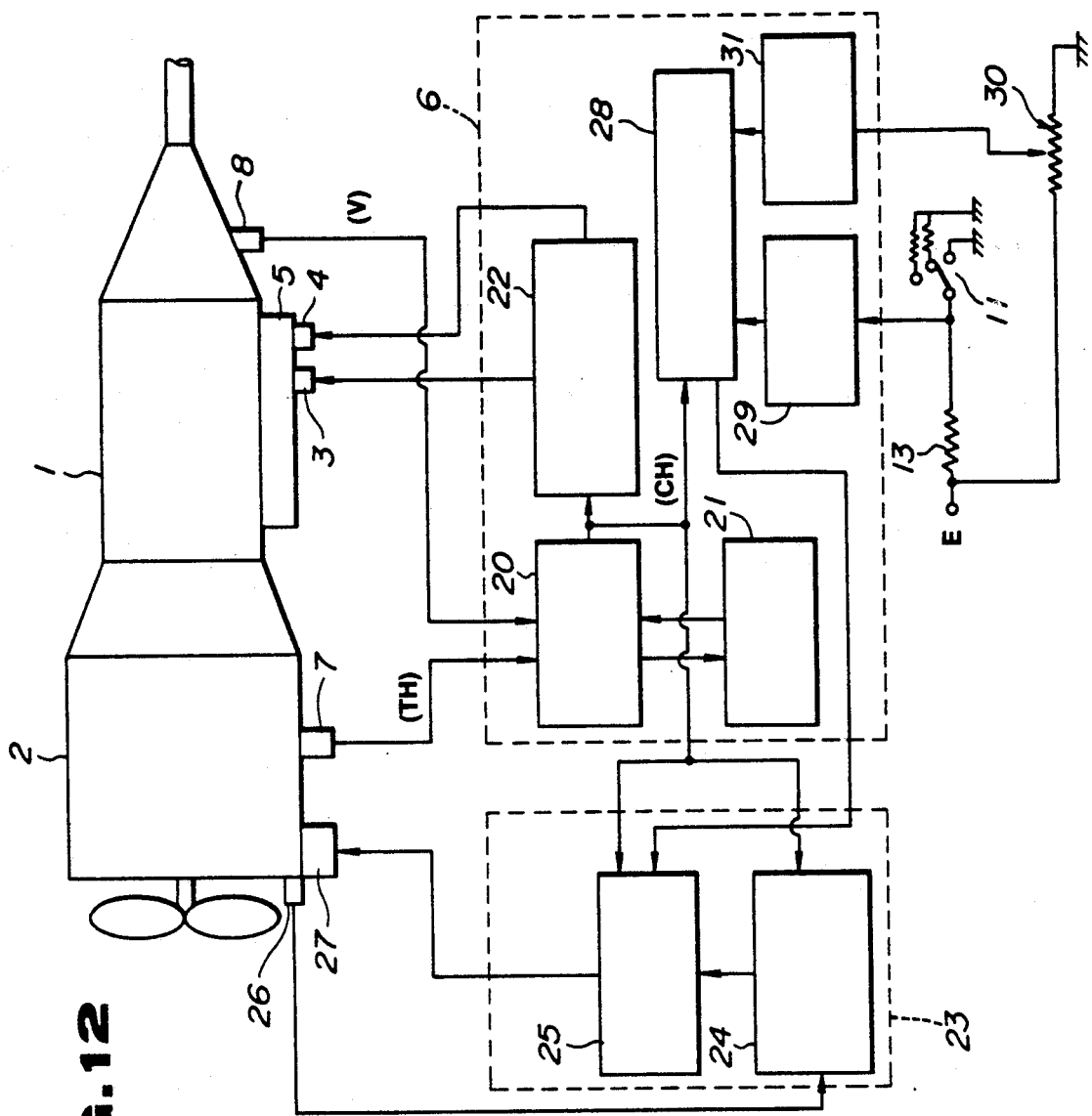
FIG. 12 is a view similar to FIG. 1, illustrating a fourth embodiment of the present invention.
Figure 13:
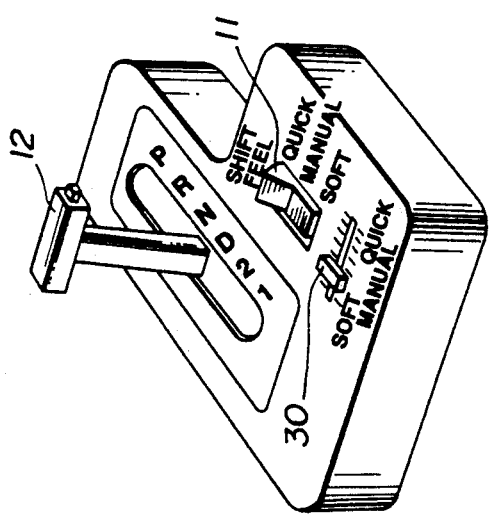
FIG. 13 is a view similar to FIG. 2, illustrating a shift feel switch and a shift feel adjuster used in the fourth embodiment.

Referring to FIGS. 12 and 13, there is shown a fourth embodiment of a shift control system according to the present invention, in which the shift feel switch 11 is of the three position type having a MANUAL position between the QUICK and SOFT positions and is provided with a shift feel adjuster 30 which is operable in the MANUAL position. The adjuster 30 is of the variable resistance type as shown in FIG. 12, the output thereof is provided to the retard amount decision circuit 28 through the A/D converter 31. In the embodiment, when shift feel switch 11 put in the QUICK position or in the SOFT position, the retard amount decision circuit 28 sets the retard amount to a predetermined value or zero in a manner similar to that mentioned above, independently of a slide position of the adjuster 30. On the other hand, when the shift feel switch 11 is put in the MANUAL poisition, the circuit 28 changes continuously the retard amount to the ignition timing decision circuit 25 in accordance with the slide position of the adjuster 30. As shown in FIG. 14, the shift feel adjuster 30 may be provided with adjusting knobs 30-1 to 30-4 corresponding to kinds of upshift operation to separately perform a fine adjustment of the shift feel.

Figure 15:
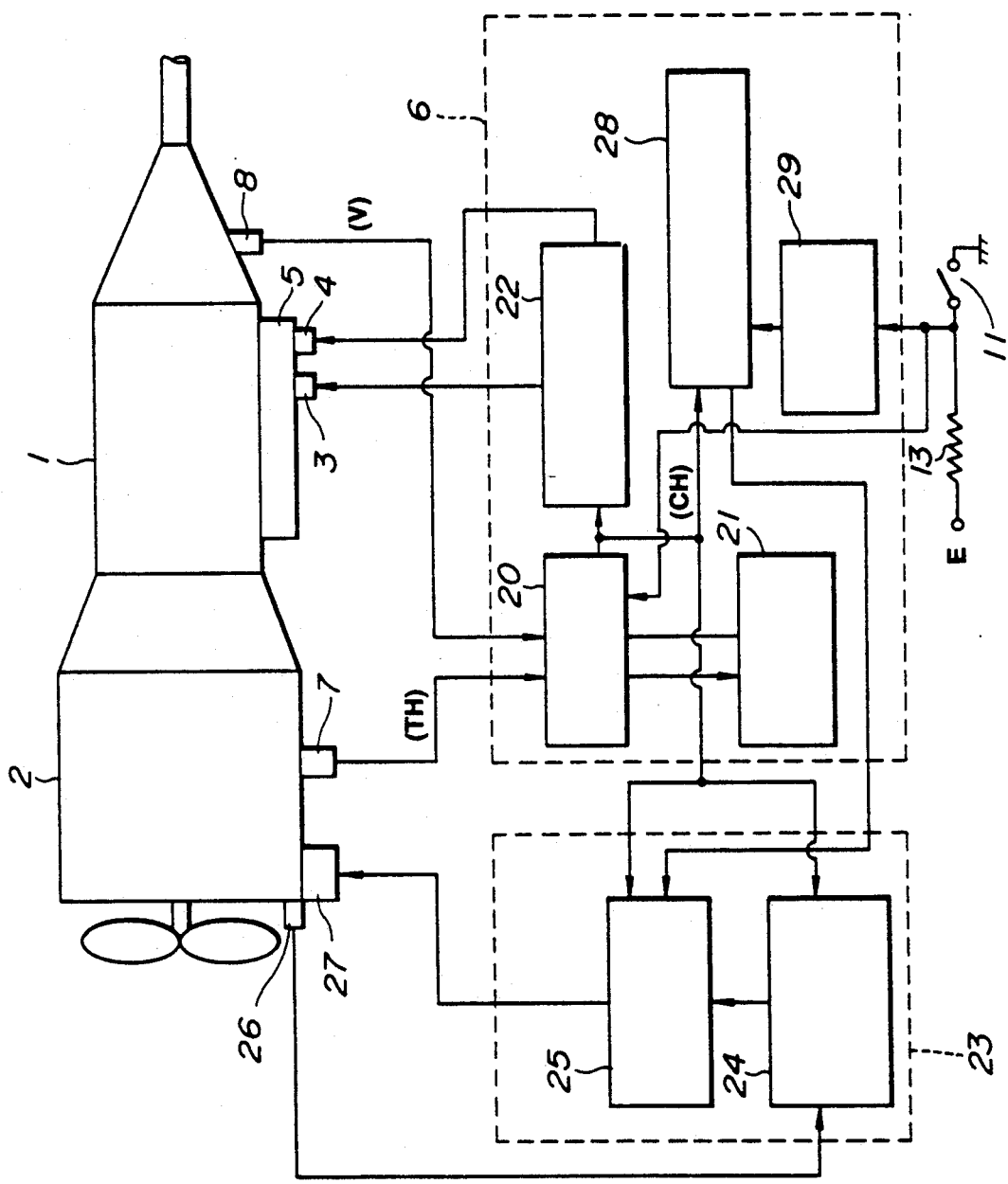
FIG. 15 is a view similar to FIG. 1, illustrating a fifth embodiment of the present invention.

Referring to FIG. 15, there is shown a fifth embodiment of a shift control system according to the present invention. In the embodiment, besides the elements of the third embodiment of FIG. 9, there is provided a circuit which inputs a signal from the shift feel switch 11 to the shift decision circuit 20, thereby to change also the shift pattern by means of the shift feel switch 11. For this purpose, both the shift pattern shown by fully drawn line and that shown by dotted line in FIG. 8 are stored in the shift pattern storage circuit 21. In a manner similar to the second embodiment of FIG. 5, the shift decision circuit 20 performs a shift judgement based on the shift pattern shown by dotted lines in FIG. 8 in the QUICK position of the shift feel switch 11, and the same on the shift pattern shown by solid lines in FIG. 8 in the SOFT position of the switch 11. However, contrary to the third embodiment of FIG. 9, the retard amount decision circuit 28 sets the retard amount to zero in the QUICK position of the shift feel switch 11 in consideration of driving power, and to a predetermined value in the SOFT position of the switch 11 to obtain the quick shift feel. Though not shown in the embodiment, the servo activating pressure control can be added as mentioned above in connection with the first embodiment of FIG. 1. In this case, the servo activating pressure is increased in the QUICK position of the shift feel switch 11 thereby to obtain quick shifting, and is decreased in the SOFT position of the switch 11 thereby to return the quick shift feel due to the retard amount to the normal shift feel.

In each of the embodiments, engine output is decreased by delaying the ignition timing. Alternatively, engine output can be reduced by increasing an exhaust gas recirculation amount and/or decreasing a fuel supply amount.

What is claimed is:

1. A shift control system for an automatic transmission for a vehicle having an engine, the automatic transmission selecting a shifting stage by selectively hydraulically operating a plurality of friction elements by a servo activating pressure, comprising:

manually operable means for modulating a demand for a shift feel and for generating a signal;

means for selecting one of a plurality of values of the servo activating pressure in response to said signal; and means for controlling the servo activating pressure in accordance with said one of said plurality of values selected.

2. A shift control for an automatic transmission as defined in claim 1, further comprising means for modulating a shift point in response to said signal.

3. A shift control system as defined in claim 1, wherein said manually operable means include a shift feel switch.

4. A shift control system as defined in claim 1, wherein said servo activating pressure value selecting means include a servo activating pressure control circuit, and said servo activating pressure controlling means include a pressure control valve.

* * * * *